United States Patent [19]

Dick et al.

[11] Patent Number: 4,559,197
[45] Date of Patent: Dec. 17, 1985

[54] METHODS AND APPARATUS FOR FLANGING TUBULAR POLYMER ARTICLES

[75] Inventors: David A. Dick, Wantage; Glyn Staines, Swindon, both of England

[73] Assignee: Metal Box p.l.c., Berkshire, England

[21] Appl. No.: 628,848

[22] Filed: Jul. 9, 1984

[30] Foreign Application Priority Data

Jul. 22, 1983 [GB] United Kingdom ............... 8319768

[51] Int. Cl.⁴ .............................................. B29C 65/00
[52] U.S. Cl. .................................... 264/249; 264/230; 264/296; 264/320; 264/342 R; 264/DIG. 71; 425/384; 425/392
[58] Field of Search ............... 264/322, 320, 319, 295, 264/296, 249, 248, 524, 339, 230, 342 R, DIG. 71; 413/4, 7; 53/471, 486, 485, 489; 29/512; 425/392, 393, 112, 384

[56] References Cited

U.S. PATENT DOCUMENTS

| | | | |
|---|---|---|---|
| 3,013,310 | 12/1961 | Foster et al. | 264/573 |
| 3,142,868 | 8/1964 | Blount | 425/11 |
| 3,445,552 | 5/1969 | Aungst et al. | 264/322 |
| 3,889,443 | 6/1975 | Wingardh | 264/319 |
| 3,933,298 | 1/1976 | Ellerbrock et al. | 229/5.6 |
| 4,156,710 | 5/1979 | Carroll et al. | 264/322 |
| 4,269,801 | 5/1981 | Klasema et al. | 264/156 |
| 4,383,966 | 5/1983 | Svetlik | 264/320 |

FOREIGN PATENT DOCUMENTS

| | | | |
|---|---|---|---|
| 1778072 | 7/1971 | Fed. Rep. of Germany . | |
| 24833 | 9/1951 | Finland | 29/512 |
| 58-153624 | 9/1983 | Japan . | |
| 593982 | 10/1947 | United Kingdom | 29/512 |
| 639997 | 7/1950 | United Kingdom . | |
| 1290548 | 9/1972 | United Kingdom . | |
| 1355413 | 6/1974 | United Kingdom . | |
| 1522342 | 8/1978 | United Kingdom . | |
| 1579604 | 11/1980 | United Kingdom . | |
| 1598125 | 9/1981 | United Kingdom . | |

*Primary Examiner*—Donald Czaja
*Assistant Examiner*—Mary Lynn Fertig
*Attorney, Agent, or Firm*—Burns, Doane, Swecker & Mathis

[57] ABSTRACT

A method and apparatus are described for flanging a tubular article of a crystallizable thermoplastic polymer, particularly of a saturated linear polyester material such as polyethylene terephthalate, which has been heat-set to an elevated temperature, e.g. for producing bodies for processable food and beverage containers. The open end of the tubular body is applied to a flanging die and heated to a flanging temperature above the glass transition temperature but below the heat-set temperature of the polymer. The tubular body and the die are forced together so that the softened end of the tubular article is forced to move outwards until it abuts against a stop ring to form the flange. The residual shrinkage in the polymer material helps it to take up the precise contours of the die and to form a well-defined flange. The flanged end is then cooled, preferably to a temperature at least 20° C. below the flanging temperature, before releasing the tubular body 10 from the die.

11 Claims, 4 Drawing Figures

METHODS AND APPARATUS FOR FLANGING TUBULAR POLYMER ARTICLES

BACKGROUND OF THE INVENTION

1. Field of the invention

This invention relates to methods and apparatus for flanging tubular polymer articles, and more specifically to the flanging of the open ends of tubular articles of crystallisable thermoplastic polymers, particularly of saturated linear polyester materials such as polyethylene terephthalate. The tubular articles may be open at both ends or may have one open end and one closed end (integral or otherwise), and they may, for example, be used as bodies for processable food and beverage containers, in which case the or each flange will usually (but not necessarily) be provided for the purpose of being seamed to an end component, e.g. of metal. The tubular bodies may be of circular, rectangular or other cross-section.

2. Description of the Prior Art

Techniques of flanging metal can bodies preparatory to attaching metal end components by seaming are well known. The flange is essentially cold swaged, using a number of rollers on a rotating head. If this method is applied to a body of a crystallisable thermoplastic polymer, the body is simply cut without any flange being formed. It is known to flange bodies made of fibre composite board for forming containers by pressing the end of the tubular body axially into a die, which is usually cold although it is known for it to be heated. So long as the moisture content of the fibre composite board is correct, a well defined flange can be rapidly produced. If this method is used with a tubular body of crystallisable thermoplastic polymer, however, the flange substantially wholly recovers the original shape of the tubular body once the axial force has been released.

It is known that biaxially drawn crystallisable thermoplastic polymers normally tend to shrink if heated above the temperature at which they were drawn, but that this tendency can be much reduced by annealing the material under restraint, e.g. at temperatures in the range of 150° C. to 230° C. This process is known as heat setting. It usually leaves the material with a residual linear shrinkage of up to about 3% which will appear on re-heating without restraint to the drawing temperature, but the heat-set articles are otherwise dimensionally stable and strong.

An object of the present invention is to provide a method and apparatus by which a well defined flange can be reliably formed upon the end of a tubular article of a heat-set crystallisable thermoplastic polymer, e.g. a saturated linear polyester such as polyethylene terephthalate. A particular object is to enable the formation of such flanges on the open ends of tubular articles which are to form the bodies of containers, which are subsequently to be seamed to metal end components.

SUMMARY OF THE INVENTION

According to the present invention, a method of flanging a tubular article of a crystallisable thermoplastic polymer which has been heat-set to an elevated temperature comprises the steps of applying an end of the tubular article to a flanging die, heating the said end of the tubular article to a flanging temperature above the glass transition temperature of the polymer but below the elevated temperature to which it has been heat-set and forcing the tubular article and the die together, so that the end of the tubular article is softened and forced to move outwards or inwards to form the flange, and then causing the flanged end of the tubular article to cool whilst restrained against deformation.

This method makes use of the residual shrinkage in the polymer to ensure close contact of the flange with the die and consequent accurate formation of the flange, while the subsequent cooling of the flanged end under restraint minimizes further shrinkage and sets the flange to the required dimensions. For high production rates forced cooling will normally be used; however, natural cooling may be used for some applications.

The heating or artificial cooling of the end of the tubular article may be effected indirectly, by thermal conduction from or to the die. Such heating via the die may be effected by means of a heat source fixedly mounted in or adjacent to the die, or by means of a heat source separate from the die and removable therefrom. The heat source may be a conductive hot body of large thermal mass heated by an internal electrical cartridge heater, hot oil, hot air, or live steam, or a radiant heater such as an electrical heating coil which may operate in the infra-red region, or a direct flame heater. A heat source located in or adjacent to the die but separate therefrom can be continuously energised but removable from the die when a desired temperature has been achieved or when the die is to be cooled.

Alternatively or additionally, the heating or artificial cooling of the end of the tubular article may be effected by heating or cooling the polymer directly by means located externally of the tubular article, e.g. by blown gas of the appropriate temperature or by an external radiant heater. Such direct heating of the end of the tubular article may be achieved before the end is brought into contact with the die.

Where the tubular article is to form the body of a container with metal ends, the die may be a metal end component of the container. In this case, the flanging operation can produce an assembly of container body and one or two metal end components ready for seaming.

Where the tubular article is open at both ends, it is possible to flange both ends simultaneously by application to similar flanging dies.

The invention also resides in apparatus for flanging tubular articles of a crystallisable thermoplastic polymer which has been heat-set to an elevated temperature, comprising a flanging die, means for holding the tubular article in position for application to the die, means for forcing the tubular article and die together, and means for heating and means for cooling the said end of the tubular article.

The means for holding the tubular article may be formed by a pair of said flanging dies arranged to engage the opposite ends of the tubular article.

The apparatus may be arranged to form the flange outwardly, in which case it preferably further comprises a stop ring disposed co-axially around the die to limit the outward movement of the end of the flange. A stop member may likewise be provided in an apparatus designed for inward flanging.

DETAILED DESCRIPTION OF THE PREFERRED EMBODIMENT

Figure 1:
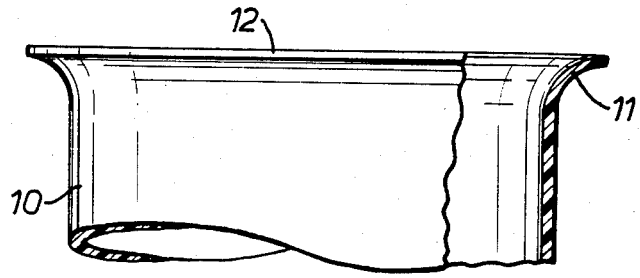
FIG. 1 illustrates, partly in elevation and partly in section, an open flanged end of a container body.

FIG. 1 illustrates a tubular body 10 of a crystallisable thermoplastic polymer, particularly a saturated linear polyester material such as polyethylene terephthalate, which has been formed with an out-turned flange 11 at its open end 12 in accordance with the method of the present invention.

Figure 2:
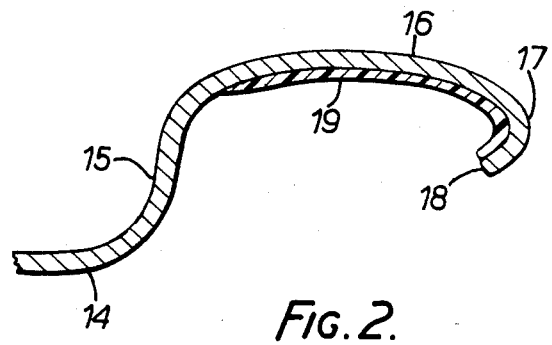
FIG. 2 illustrates in section, to a larger scale, the form of the outer rim of an end component to be seamed to the open end of the container as shown in FIG. 1.

FIG. 2 illustrates the form of the rim of an end component 14 which is to be seamed to the flange 11 so as to close the open end 12 of the container body 10. The end component 14 has an upwardly extending wall 15, a seaming panel 16 extending outwardly from the wall 15 and an inwardly curled portion 17 at its outer rim, terminating in an inwardly directed cut edge 18. A plastic lining compound 19 may, as shown, be provided on the underside of the seaming panel 16, if required to give a hermetic seal.

Figure 3:
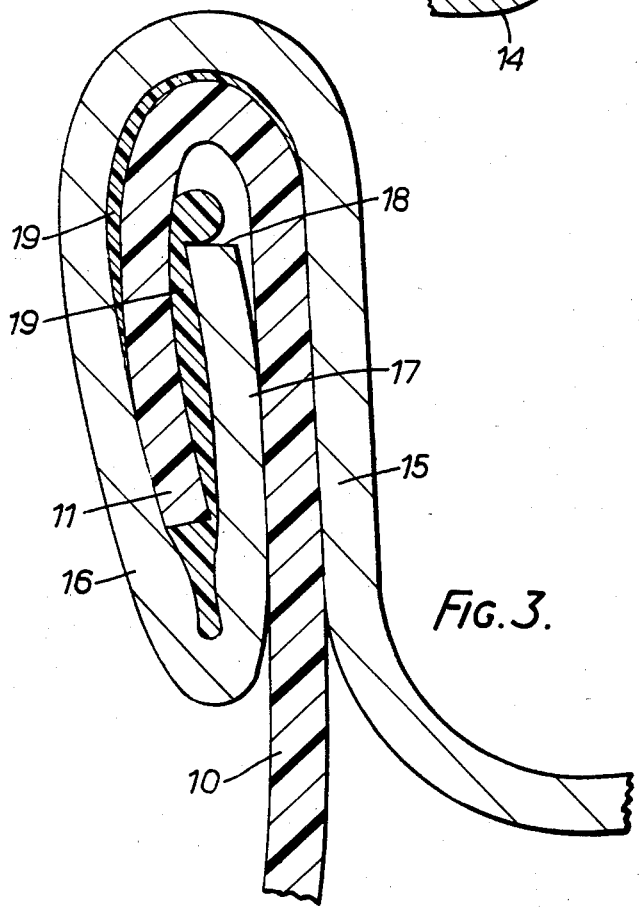
FIG. 3 illustrates in section, to a larger scale again, the form of the seamed joint between the container body and the end component.

As shown in FIG. 3, when the end component is seamed to the flange 11, the curled outer portion of the seaming panel lies inside the flange 11 and against the upper part of the wall of the container 10. The flange 11 is bent down substantially vertically and the greater part of the seaming panel 16 lies outside the flange 11 and in close contact with it, the lining compound (if any) helping to seal the joint. The upstanding wall 15 of the end component lies against the inside of the upper part of the wall of the container 10.

Figure 4:
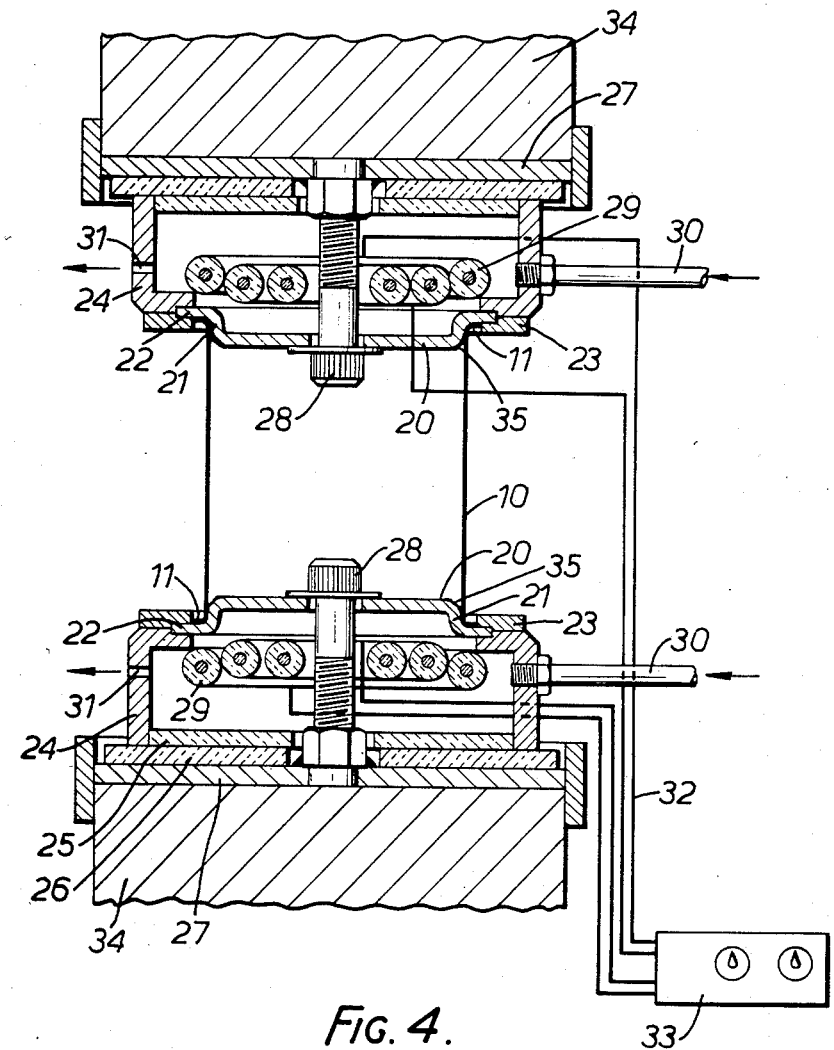
FIG. 4 illustrates in section an apparatus for flanging tubular polymer articles in accordance with the invention.

In order for such a seamed joint to be reliably made in large scale production with a minimum of faults, it is essential that the flange 11 on the container body 10 should be well defined, i.e. accurately made within close tolerances. The apparatus illustrated in FIG. 4 is designed to produce such flanges on tubular bodies 10 of saturated linear polyester materials such as polyethylene terephthalate, which are open at both ends. The apparatus is essentially symmetrical so that both ends of the body 10 can be flanged simultaneously.

Both upper and lower portions of the apparatus include a metal die 20 having a vertical wall 21 and an out-turned horizontal flange 22 for forming the flanges 11. The die 20 is surrounded by a co-axial stop ring 23 whose inner periphery is spaced from the wall 21 by a distance equal to the desired width of the flange 11. The stop ring 23 is secured to a drum shaped housing 24 mounted through heat insulating pads 25, 26 on a base 27, while the die 20 is secured to the base 27 by a cap screw 28. The die 20 and stop ring 23 can thus be readily removed and exchanged for similar components of different size, in order to deal with container bodies 10 of corresponding different size.

The housing 24 accommodates an electrical heating coil 29 and is provided with an inlet 30 and outlet 31 for cooling air. The heating coils 29 are connected through leads 32 to a temperature control apparatus 33. The base plates 27 are each mounted on a block or platen 34 of a hydraulic press.

In use, a cylindrical container body of biaxially drawn polyester material, such as polyethylene terephthalate, which has been produced for example as disclosed in our published British patent application No. 8037137 (publication No. 2089276A) and which has been heat-set, for example as described in our co-pending British patent application No. 8310966, is placed in the apparatus as illustrated at 10, with its open ends in contact with the lead-in taper 35 of the top and bottom dies 20. Before, during and/or after this location of the body the dies 20 are rapidly heated to a flanging temperature above the glass transition temperature of the polymer but below the temperature to which it has been heat-set, typically to 125° C. for polyethylene terephthalate. A compressive load of up to 200 Kg, typically 30 Kg, is then applied to the body 10 by forcing the flanging dies 20 of the press towards one another by means (not shown) acting on the platens 34. The ends of the body 10 are thereby softened and forced to move outwards to form the flanges 11 until the end of the flange abuts against the stop ring 23. The polymer material of each flange tends to undergo residual shrinkage as the heat from the respective die 20 penetrates into it; this helps the polymer to take up the precise contours of the die 20 and to form a well defined flange.

The heaters 29 are then switched off and the die 20 is force-cooled by cooling air introduced through the inlet 30 and exhausted through the outlet 31 until the temperature of the flanged end has dropped substantially to at least 20° C. (typically 40° C.) below the flanging temperature and possibly to or beneath the glass transition temperature of the polymer. This stops or at least minimizes further thermal shrinkage and sets the flange to the required well defined dimensions.

The axial load is then released and the flanged body 10 removed from the apparatus.

The method and apparatus described specifically above may be modified within the ambit of the invention. In particular, for containers with a single open end, one of the dies 20 may be replaced by a flat or shaped abutment to bear against the closed end of the container to apply the flanging load.

In place of the electrical radiant heating coils 29 described above, which are fixedly mounted adjacent to the die 20, one may use a heater in the form of a removable conductive body of large thermal mass, i.e. a hot block, which is brought into direct contact with the die 20 for heating it but is removable therefrom for cooling. The hot block may be continuously energised, and may have an internal cartridge heater or be heated by circulation of hot oil, hot air or live steam, for example. Electrical resistance heating may be used, e.g. by passing a heating current through the operative part of the die. Inductive heating may also be used. Hot air circulation may also be used to heat the die.

Cooling of the dies may be effected by means of a liquid coolant, rather than by cooling air as described above. The heating and/or the cooling means provided for each flange may be located externally of the tubular article so as to act directly on the flange material, and the die 20 may be used as a heat sink for cooling.

One or both of the dies 20 may be a metal end component of the container, so that the flanging operation results in an assembly of container and end component which can then be passed immediately to a seaming machine.

If desired, the container can be formed with an inwardly projecting neck below the or each flange, by providing the respective die with a corresponding annular reduction in the wall 21 into which the polymer material may shrink.

With suitable arrangement the apparatus may be arranged to form flanges on container bodies 10 which are other than circular in section, e.g. rectangular or oval.

We claim:

1. A method of flanging a tubular article of a thermoplastic polymer which, following drawing, has been heat-set to an elevated temperature, leaving the material with a residual shrinkage capability, comprising the steps of: applying an end of the tubular article to a flanging die in engagement with the inner surface of the end, heating the said end of the tubular article to a flanging temperature above the glass transition temperature of the polymer but below the elevated temperature to which it has been heat-set, forcing the tubular article and the die together, so that the end of the tubular article is softened and forced by the die to move outwards to form a flange, the material of which undergoes residual shrinkage to establish well defined flange dimensions as the polymer takes up the contours of the die, and then causing the flanged end of the tubular article to cool whilst restrained against deformation to set the flange in accordance with said well defined dimensions.

2. A method according to claim 1 wherein the heating of the end of the tubular article is effected by thermal conduction from the die.

3. A method according to claim 2 wherein the die is heated by means of a heat source fixedly mounted in or adjacent to the die.

4. A method according to claim 2 wherein the die is heated by means of a heat source separate from the die and removable therefrom.

5. A method according to claim 1, wherein the end of the tubular article is heated by a heating means located externally of the tubular article.

6. A method according to claim 1, wherein the end of the article is cooled artificially by thermal conduction to the die, the die having cooling means provided therefor.

7. A method according to claim 1, wherein the end of the article is cooled artificially by a cooling means located externally of the tubular article.

8. A method according to claim 1, in which the tubular article is to form the body of a container with metal ends, wherein the die is a metal end component of the container.

9. A method according to claim 1, wherein both ends of the tubular article are flanged simultaneously by application to similar flanging dies.

10. Apparatus for flanging tubular articles of a thermoplastic polymer which, following drawing, has been heat-set to an elevated temperature, comprising: a pair of flanging dies arranged to engage opposite ends of the tubular article for forming an outward flange simultaneously at both ends of the tubular article, means for forcing the dies towards each other, and means for heating and means for cooling the said ends of the tubular article.

11. Apparatus according to claim 10 further comprising a stop ring disposed co-axially around each die to limit the outward movement of the end of the respective flange.

* * * * *